(12) United States Patent
Boehme et al.

(10) Patent No.: US 9,857,578 B2
(45) Date of Patent: Jan. 2, 2018

(54) LASER SCANNING MICROSCOPE

(71) Applicant: Carl Zeiss Microscopy GmbH, Jena (DE)

(72) Inventors: Beate Boehme, Grosspuerschuetz (DE); Matthias Wald, Jena (DE); Tiemo Anhut, Jena (DE); Daniel Schwedt, Weimar (DE)

(73) Assignees: Carl Zeiss Microscopy GmbH, Jena (DE); Carl Zeiss AG, Oberkochen (DE)

( * ) Notice: Subject to any disclaimer, the term of this patent is extended or adjusted under 35 U.S.C. 154(b) by 0 days.

(21) Appl. No.: 14/933,917

(22) Filed: Nov. 5, 2015

(65) Prior Publication Data
US 2016/0131881 A1 May 12, 2016

(30) Foreign Application Priority Data

Nov. 12, 2014 (DE) ........................ 10 2014 017 002

(51) Int. Cl.
*G02B 26/08* (2006.01)
*G02B 21/00* (2006.01)
*G02B 26/10* (2006.01)

(52) U.S. Cl.
CPC ....... *G02B 21/0048* (2013.01); *G02B 21/006* (2013.01); *G02B 21/008* (2013.01); *G02B 21/0032* (2013.01); *G02B 21/0076* (2013.01); *G02B 26/0833* (2013.01); *G02B 26/101* (2013.01)

(58) Field of Classification Search
CPC .. G02B 21/48; G02B 21/0032; G02B 21/006; G02B 21/06; G02B 21/008; G02B 21/0076; G02B 26/08; G02B 26/0833; G02B 26/101; G02B 26/10

USPC .................................. 359/201.1, 201.2, 385
See application file for complete search history.

(56) References Cited

U.S. PATENT DOCUMENTS

| 5,691,839 A | 11/1997 | Kobayashi |
| 5,936,764 A | 8/1999 | Kobayashi |
| 7,715,078 B2 * | 5/2010 | Okugawa ........... G02B 21/0048 359/201.2 |

(Continued)

FOREIGN PATENT DOCUMENTS

DE 102010026571 A1 1/2012

OTHER PUBLICATIONS

German Search Report for DE 10 2014 017 002.0, dated Dec. 11, 2014 (7 pgs).

*Primary Examiner* — Euncha Cherry
(74) *Attorney, Agent, or Firm* — Patterson Thuente Pederson, P.A.

(57) ABSTRACT

A laser scanning microscope for the acquisition of object images according to varied observation criteria. The microscope includes an illumination and detection unit, an illumination and a detection beam, a microscope objective, a scanning device with a scanning optical component and several scanners, with switching mirrors, each mirror with two switching positions, provided in the illumination and detection beams. Each switching position is assigned to one of several different, optically separate beam paths and each beam path defines a separate operating mode. A concave mirror for imaging a first scanner into at least one more scanner and vice versa is arranged in at least one of the beam paths.

15 Claims, 4 Drawing Sheets

(56) References Cited

U.S. PATENT DOCUMENTS

2008/0316561 A1 12/2008 Okugawa
2013/0107338 A1 5/2013 Richter et al.

* cited by examiner

LASER SCANNING MICROSCOPE

RELATED APPLICATION

The present application claims priority to German Application No. 102014017002.0, filed Nov. 12, 2014, said Application being hereby incorporated herein in its entirety by reference.

FIELD OF THE INVENTION

The invention relates to a laser scanning microscope adapted for scanning an object by means of laser spots in various operating modes for the purpose of obtaining object images according to varied criteria.

BACKGROUND OF THE INVENTION

In laser scanning microscope applications, live cell research plays an ever-increasing part, examples being the observation of metabolic processes in cells, or the analysis of the effect of pharmaceuticals. Besides the detection of reflected light, fluorescence microscopy is of particular importance, as it permits subcellular optical observation and can be employed not only for mere imaging but also for specimen manipulation and analysis, for which single-photon or multiphoton processes are used. Specimens can, for example, be manipulated in a defined manner at one scanning speed and observed at a second, e.g., higher scanning speed.

For such scientific applications, microscope systems must satisfy increasingly stringent requirements. On the one hand, data have to be acquired at a high speed to permit the course of biological processes to be followed in time; on the other hand, light losses in the beam paths should be avoided. This can be achieved, for example, if the beam paths between light source and detector have the least number of optical components while providing the maximum possible transmittance and resolution in the varied applications.

SUMMARY OF THE INVENTION

This is the field where the present invention comes in. The problem of the invention in this context is to develop a laser scanning microscope having various preselectable operating modalities that allow the microscope to be optimally configured in a simple manner, especially by fast switching over to meet the respective experimental requirements, for example, by means of decoupling the deflection angles and deflection speeds of the individual scanner axes, and the resulting capabilities of separate control.

This problem is solved with a laser scanning microscope of the type mentioned at the start, comprising:
- an illumination and detection unit (BDE), an illumination and a detection beam, a microscope objective, a scanning device with a scanning optical component and several scanners, with
- the illumination and detection beams being provided with switching mirrors, each with two switching positions,
- each switching position being assigned to one of several different, optically separate beam paths, each beam path defining a separate operating mode, and
- at least one of the beam paths being provided with a concave mirror for imaging a first scanner into at least one other scanner and vice versa.

In a first preferred embodiment of the invention based thereon, the scanning objective is designed for forming a curved intermediate image at a finite distance, with
- a first beam path being provided with a collecting refractive lens optical component for imaging the first scanner via the second switching mirror onto a pupil plane arranged between the second switching mirror and the illumination and detection unit, and vice versa, and
- the second beam path being provided with a concave mirror for imaging the first scanner into the second scanner, and subsequently with a relay optical component for imaging the second scanner via the second switching mirror onto the pupil plane arranged between the second switching mirror and the illumination and detection unit, and vice versa.

The first scanner is designed to double as a switching mirror with two switching positions. These two switching positions expressly influence the direction of the illumination and detection beams, but not the scanning deflection within the beam, which is controlled separately.

In the first path, the refractive lens optical component images the first scanner via the second switching mirror directly onto the pupil plane, and vice versa, whereas in the second path, the concave mirror images the first scanner into the second scanner, and the relay optical component images the second scanner via the second switching mirror onto the pupil plane, and vice versa.

This imaging of the pupil planes in all operating modes also ensures an equal effect of pupil manipulations on all spots in multiconfocal imaging. As a less accurate axial pupil position is sufficient for single-spot applications, the refractive lens optical component in the first operating mode may also be displaced, and the relay optical component in the second operating mode may be left out.

Whereas, then, in the first operating mode, the ray-collecting effect is generated by means of the refractive lens optical component, the second operating mode achieves this by means of the concave mirror, with an intermediate image plane each being located between the first scanner and the concave mirror, and between the first scanner and the collecting lens optical component.

The first scanner is arranged in a pupil plane defined by the position of the microscope objective. Between the concave mirror and the second switching mirror, further switching mirrors may be provided in order to include into the illumination and detection beams, in addition to the second scanner, a third scanner with a separate axis of rotation, preferably for Y deflection similar to the second scanner.

Optionally, the scanning optical component arranged between the microscope objective and the first scanner may be shiftable or have a variable focal distance, e.g., in order to fix the pupil plane at the first scanner if different microscope objectives are used.

In a second preferred embodiment of the invention departing from the above, the scanning objective is designed for imaging at an infinite distance, with
- a first beam path, in which the illumination beam is directed from the illumination and detection unit to the first scanner via the second switching mirror and subsequently into the scanning objective, and, vice versa, the detection beam is directed from the scanning objective to the first scanner and then into the illumination and detection unit via the switching mirror, and with
- a second beam path, in which the illumination beam is directed from the illumination and detection unit to the first scanner via the switching mirror, the second scanner and the concave mirror, and, vice versa, the detection beam is directed from the first scanner to a second scanner via the concave mirror and subsequently into the illumination and detection unit via a collimator and the switching mirror.

Here, an intermediate image plane is provided between the concave mirror and the second scanner. Optionally, another scanner, preferably for Y deflection, may be integrated between the first scanner and the second switching mirror in the illumination and detection beams.

Thus, this second embodiment also has two different beam paths and can therefore be used in two different operating modes.

In both embodiments, the capability of switching the switching mirror and the first scanner serves for changing the direction of the illumination and detection radiations depending on the beam path to be used. The switching mirror and the scanning mirror of the first scanner are arranged to be tiltable relative to the incident radiation about a defined axis. It is within the scope of the invention to impose on the scanning movement of the first scanner, instead of the tilt, an offset communicating with the switching positions of the switching mirror.

A third embodiment of the laser scanning microscope invented is provided with the concave mirror for imaging the first scanner into a second scanner or a third scanner, and subsequently with a relay optical component for imaging the scanners onto a pupil plane and vice versa. Here, switching mirrors for deflecting the illumination and detection beams in two different beam paths are provided between the concave mirror and these two scanners, with the second scanner being arranged in one of those beam paths, and the third scanner in the other one.

By means of the switching mirrors, short switching times in changing the beam paths and using the two scanners can be achieved, which is of advantage especially if the method known as FRAP (Fluorescence Recovery After Photobleaching) is employed, where one pair of scanners is used for optical manipulation in the specimen and switching to observation is then necessary within a few milliseconds, e.g. by means of a resonance scanner.

It is within the scope of the invention, depending on the embodiment selected, to configure the first scanner as an MEMS scanning mirror for two-dimensional X,Y deflection and the other scanners for one-dimensional, e.g., extra-fast, resonant Y deflection of the illumination and detection beams. Generally, both the first and the second scanner may be intended for deflection in orthogonal spatial directions X or Y. Alternatively, the first scanner may also be configured as a unidimensional, e.g., galvo scanner for the X direction and complemented by a Y galvo scanner arranged downstream at a close distance, so that the combination of the two scanners performs a two-dimensional X,Y deflection of the scanning objective.

The laser scanning microscope invented is equipped with a control circuit, which is connected
- with the switching mirrors, for the purpose of varying the angles of incidence and reflection of the illumination and detection radiations,
- with the scanners, for the purpose of preselecting a laser spot sequence in scanning the object,
- with a command input device for preselecting one of the operating modes, and
- optionally with the scanning optical component, for adjusting the pupil position on the first scanner.

Furthermore, an optical component with an adaptive optical element may be coupled into the illumination and detection beams, this component being designed to influence the Z position of the laser spots, to correct system- or object-related image aberrations and/or to enable the use of special imaging modalities, and for this purpose being also connected with the control circuit.

The laser scanning microscope invented is preferably adapted for fluorescence microscopy with the illuminating light serving as excitation radiation, and the resulting fluorescence as detection radiation.

A laser scanning microscope distinguished by the characteristics according to the invention permits optimum utilization with regard to different requirements of object imaging, thanks to switching to the various operating modes, especially to the decoupling of deflection angle and deflection speed of the separate scanner axes.

BRIEF DESCRIPTION OF THE DRAWINGS

Below, the invention is described in some exemplified detail with reference to the attached drawings, in which.

DETAILED DESCRIPTION OF THE DRAWINGS

Figure 1:
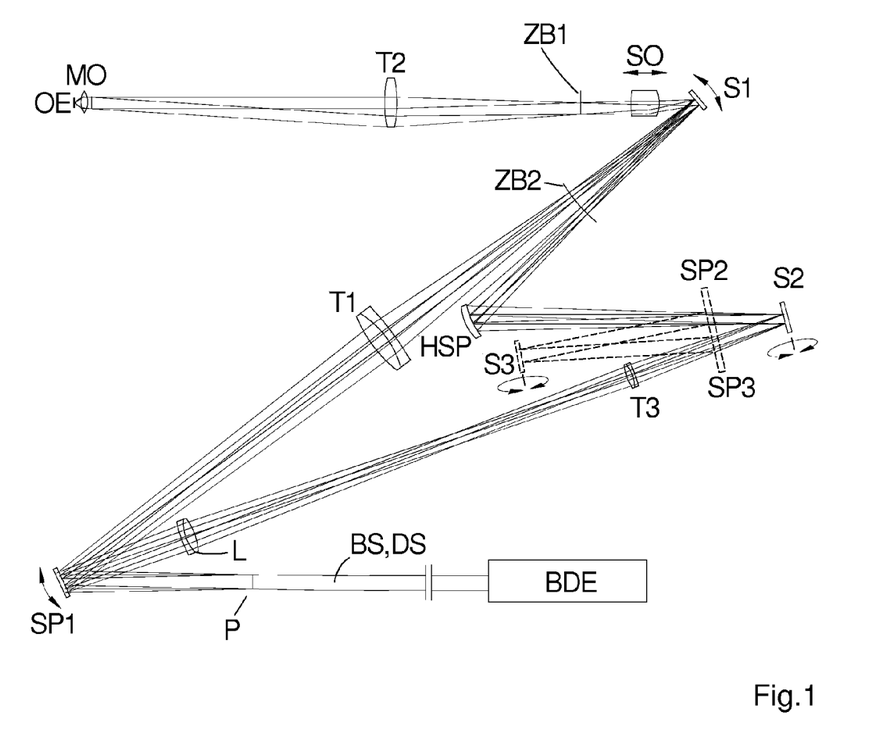
FIG. 1 shows the beam path for the illumination and detection beams in a first embodiment of the invention, provided with a scanning optical component forming an image onto an intermediate image plane at a finite distance.

FIG. 1 illustrates the general structure of the invented laser scanning microscope, adapted for fluorescence microscopy, for example.

The excitation light generated in an illumination and detection unit BDE is directed to a switching mirror SP1, which is arranged to be tiltable to two switching positions relative to the incident radiation. The illumination and detection unit BDE can supply and detect either a single beam for confocal scanning of the specimen by means of a single spot, or several beams for multiconfocal scanning of the specimen. In this connection, FIG. 1 shows several beams, which generate, in the intermediate images ZB1, ZB2 and in the specimen, three spots for multiconfocal scanning and are incident on the pupil P at different angles.

In a first tilting position, which is assigned to a first operating mode, the excitation light reflected by switching mirror SP1 is directed at a scanner S1 via a first illumination and detection path. Thereby, the pupil P is imaged on scanner S1 via switching mirror SP1 by means of a collecting refractive lens optical component T1. The excitation light is further directed from scanner S1 into an object to be examined, or an object plane OE, via a scanning optical component SO, which projects the image from an intermediate image ZB2 that is concentric about S1 onto an intermediate image ZB1, and further via a tube-lens optical component T2 and a microscope objective MO.

In the second tilting position, which is assigned to a second operating mode, the excitation light reflected by switching mirror SP1 is directed at scanner S1 via an alternative illumination and detection path by means of a relay optical component L/T3, a scanner S2 and a concave mirror HSP, with an intermediate image ZB2 located between concave mirror HSP and scanner S1.

The scanning mirror of scanner S1 swivels about an axis aligned normal to the drawing plane of FIG. 1, whereas that of scanner S2 swivels about an axis lying in the drawing plane. The geometry and dimensions of the concave mirror HSP in the drawing plane correspond to the angular range required by the illumination and detection unit BDE in the multispot or single-spot method, respectively. The geometry and dimensions of the concave mirror HSP normal to the drawing plane correspond to the deflection range of scanner S2.

Scanner S1 may be configured as a MEMS scanning mirror and intended for one-dimensional deflection in the X or Y coordinate or for two-dimensional X,Y deflection, whereas scanner S2 is designed as a fast unidimensional scanning mirror for one-dimensional deflection in the Y coordinate and moves the laser spot along the Y axis across the longer side of concave mirror HSP. The tilting axis of scanner S2 is arranged normal, or approximately normal, to the switching axis of switching mirror SP1.

It is within the scope of the invention if scanners S1 and S2 are each configured as a unidimensional resonance or galvo scanner and are imaged one upon the other by means of a concave mirror, with both scanners being located on conjugate pupil planes. Optionally, a further galvo scanner may be provided between S1 and the refractive lens optical component T1 to supplement scanner S1.

Whereas the collecting action in the first operating mode is performed by the collecting refractive lens optical component T1, this function in the second operating mode is performed by concave mirror HSP.

From scanner S1, the excitation light is directed into the object, i.e., to object plane OE via scanning optical component SO, tube-lens optical component T2 and microscope objective MO, as described above.

Scanner S1 is located in a pupil plane conjugate with the pupil of microscope objective MO. The switching positions of scanner S1 and switching mirror SP1 communicate with each other in such a way that the excitation light reaches the scanning optical component SO either in the first operating mode via the first illumination and detection path or in the second operating mode via the second illumination and detection path.

This conformity is achieved either by arranging the scanning mirror of scanner S1 to be tiltable to two switching positions just like switching mirror SP1, or by imposing an offset on the scanning movement of scanner S1.

The two switching mirrors SP2, SP3 shown by broken lines in FIG. 1 are optionally intended for beam deflection— here, for example, deflection out of the drawing plane—in an embodiment of the invention already mentioned above, in order to deflect the radiation along different paths, via either scanner S2 or scanner S3. Thereby, both the stationary beam going to scanner S2 and the moving beam reflected by scanner S2 are deflected by the assigned switching mirror SP2 or SP3, respectively.

In this way, pupil imaging and switching actions are possible simultaneously and with the least complex equipment configuration, since switching mirrors SP2, SP3 enable short switching times with regard to alternating uses of the two scanners S2 and S3, which is of advantage especially in FRAP (Fluorescence Recovery After Photobleaching) applications.

Switching mirror SP1 and scanner S1 are connected to a control circuit (not shown on the drawing), which presets the tilting positions as a function of the operating mode selected.

The control circuit, in turn, is coupled to a command input device for manual preselection of the desired operating mode.

However, it is also within the scope of the invention if the preselection is carried out automatically, for example, as a function of certain results of analyzing the object image.

In a direction opposite to that of the excitation light, the detection radiation emanating from the object reaches the illumination and detection unit BDE either via the first or the second illumination and detection path and the other beam paths, depending on the operating mode, and serves for image acquisition with subsequent visual or electronic image analysis as usual.

The first operating mode of the invented arrangement, in which object scanning and image acquisition are performed via the first illumination and detection path, is preferably intended to feature two-dimensional beam deflection by scanner S1. Thereby, the detection radiation generated during the scanning of the object in the coordinates X,Y normal to the optical axis of the microscope objective MO proceeds from scanner S1 via the lens optical component T1 and switching mirror SP1 into pupil P and into the illumination and detection unit BDE.

The second operating mode, in which object scanning and image acquisition are performed via the second illumination and detection path, is preferably intended to feature unidimensional beam deflection by S1, so that thereby, for example, object scanning is performed in the X coordinate (lying in the drawing plane of FIG. 1) and scanner S2 likewise serves for one-dimensional scanning, but in the Y coordinate (normal to the drawing plane of FIG. 1). As an advantage, therefore, one of the two scanners S1, S2, preferably scanner S2, can deflect faster than the other can.

If the invented arrangement is used in the first operating mode, the lens optical component T1 creates a virtual intermediate image ZB2 of the illuminating light, so that scanner S1 is illuminated by a divergent beam.

By contrast, if the second operating mode is used, scanner S2 is illuminated via the relay optical component L/T3 by a collimated beam, so that now the concave mirror HSP creates the virtual intermediate image ZB2 in front of scanner S1, the curvature radius of ZB2 corresponding to the distance to scanner S1.

Thus, the laser scanning microscope invented is provided with a scanning device which is of low complexity and in which the pupil image is created in a simple manner by means of a preferably toric concave mirror HSP. If required after a change of objectives, the pupil position can be corrected by an axial displacement of the scanning optical component SO. Although an afocal relay optical component might be used for that purpose, this would require simultaneous axial movements of the optical components arranged before and behind it.

It is expressly in the scope of the invention to use, instead of the toric concave mirror HSP, a spherical mirror in combination with a cylindrical lens in the non-scanned part of the beam.

Figure 2:
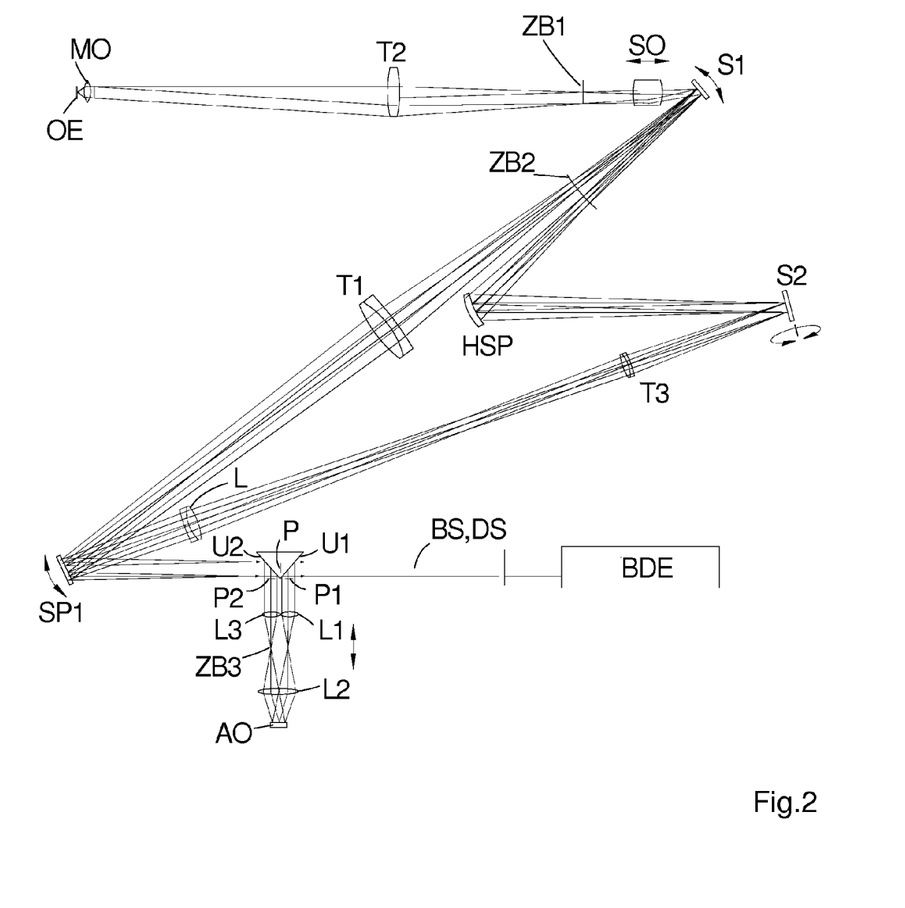
FIG. 2 shows the embodiment according to FIG. 1, with an adaptive optical element arranged in the illumination and detection beams.

FIG. 2 shows the embodiment according to FIG. 1, but with an optical component comprising a reflective adaptive optical element AO provided in the illumination and detection beams BS, DS.

The adaptive optical element AO serves for Z positioning of the laser spots in addition to the X,Y scanning movement, for which purpose it is also connected with the control circuit already mentioned. The adaptive optical element AO can furthermore be used to compensate aberrations caused by the optical system and/or the object itself. It is known that the point-spread function of the laser spots varies with the lateral position in the object volume or in the image field, resulting in aberrations increasing with the distance of the laser spots from the optical axis of the objective.

The optical component mentioned is arranged in the illumination and detection beams BS, DS in the position of pupil plane P. It has two beam deflection elements U1, U2, which are arranged symmetrically to pupil plane P in the illumination and detection beams BS, DS.

By means of the first beam deflection element U1, the illumination beam BS is directed via a first and a second lens optical component L1, L2 onto the adaptive optical element AO, and from there via the second and a third lens optical component L2, L3 onto the second beam deflection element U2, and from there onto the switching mirror SP1.

In the opposite direction, the detection beam DS coming from the switching mirror SP1 is directed, by means of the second beam deflection element U2, via the third and second lens optical components L2, L3 onto the adaptive optical element AO, and from there via the second and first lens optical components L1, L2 onto the first beam deflection element U1, before it enters the illumination and detection unit BDE.

Between the second lens optical component L2 for one thing and the first and third lens optical components L1, L3 for another, an intermediate image plane ZB3 is provided. Further pupil planes P1, P2 are provided between the first beam deflection element U1 and the first lens optical component L1, and between the second beam deflection element U2 and the third lens optical component L3, respectively, with the pupil planes P, P1, P2 being conjugate with each other.

The optical component shown, or at least a prism with the beam deflection elements U1, U2, is connected with a swiveling device (not shown), by means of which it can be swiveled into and out of the shown position relative to pupil plane P, where required. Thanks to this option, the laser scanning microscope can be used in either of the configurations described with reference to FIG. 1 and FIG. 2.

Figure 3:
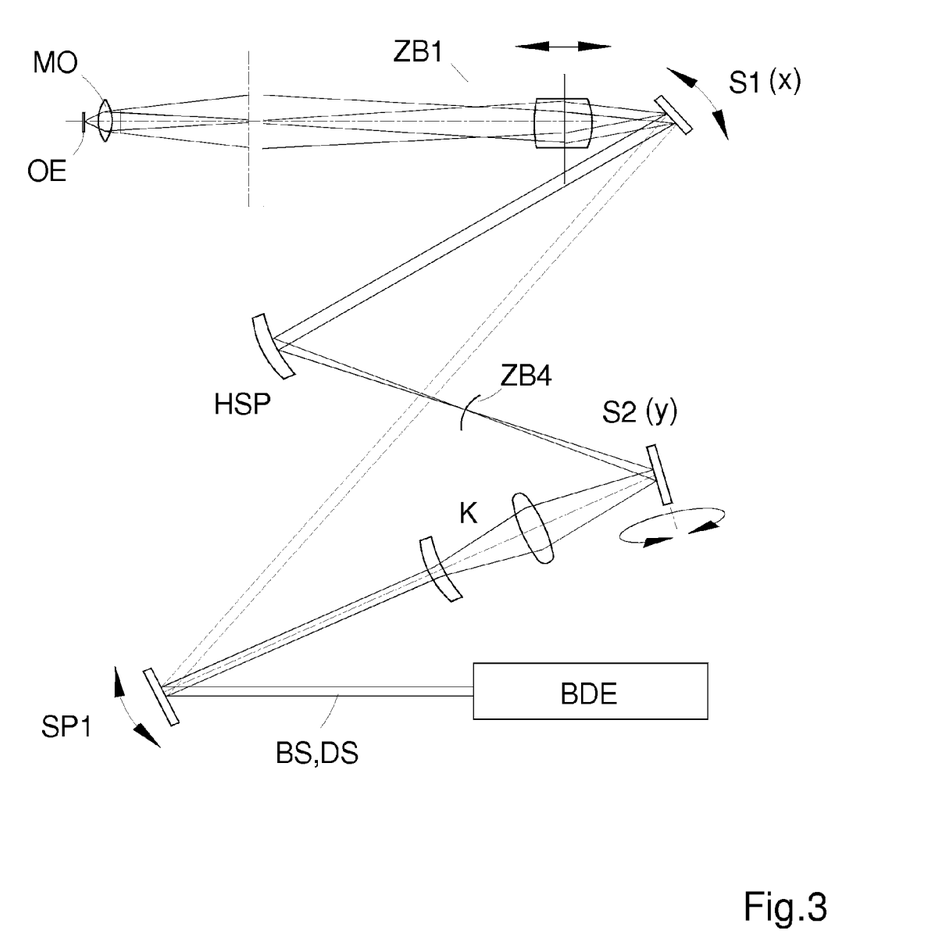
FIG. 3 shows the beam path of the illumination and detection beams in a second embodiment of the invention, provided with a scanning optical component forming an image at an infinite distance.

FIG. 3 shows the beam paths of the illumination and detection beams in a second embodiment of the invented laser scanning microscope, in which—unlike the examples shown in FIG. 1 and FIG. 2—the scanning optical component SO projects the image to infinity. Other than FIG. 1 and FIG. 2, FIG. 3 shows only one beam for confocal scanning of the specimen by means of a single spot.

Via a first beam path, which is assigned to a first operating mode of this embodiment, the excitation light coming from the illumination and detection unit BDE directly reaches scanner S1 via switching mirror SP1, and subsequently reaches the scanning objective SO, from where, as described above, it is forwarded by the microscope objective MO onto the object plane OE to be imaged.

The detection light captured by microscope objective MO and made parallel by scanning objective SO hits the first scanner S1, which directs it into the illumination and detection unit BDE via switching mirror SP1.

Via a second beam path, which is assigned to a second operating mode, the excitation light coming from the illumination and detection unit BDE is directed via switching mirror SP1, scanner S2 and scanner S1 into the scanning objective SO, from where it reaches microscope objective MO and object plane OE to be imaged.

Made parallel by scanning objective SO, the detection light is directed by the first scanner S1 onto concave mirror HSP, which now focuses the light descanned in X direction at its intermediate image ZB4, which is curved away from scanning objective SO. Arranged at the center of curvature of the intermediate image ZB4 is the second scanner S2, which is illuminated divergently by the detection light. Arranged downstream of scanner S2 is a collimator K, which forwards the detection light, now made parallel, to the illumination and detection unit BDE via switching mirror SP1.

In this way, scanners S1, S2, with or without imaging elements, can be permanently provided in the course of the illumination and detection beams BS, DS or be switched in by the user as desired.

Like in FIG. 1, here, too, scanner S1 may be designed as a MEMS scanning mirror and serve either for one-dimensional deflection in the X or Y coordinate or for two-dimensional X,Y deflection, whereas scanner S2 is designed as a fast unidimensional scanning mirror for one-dimensional deflection in the Y coordinate.

Figure 4:
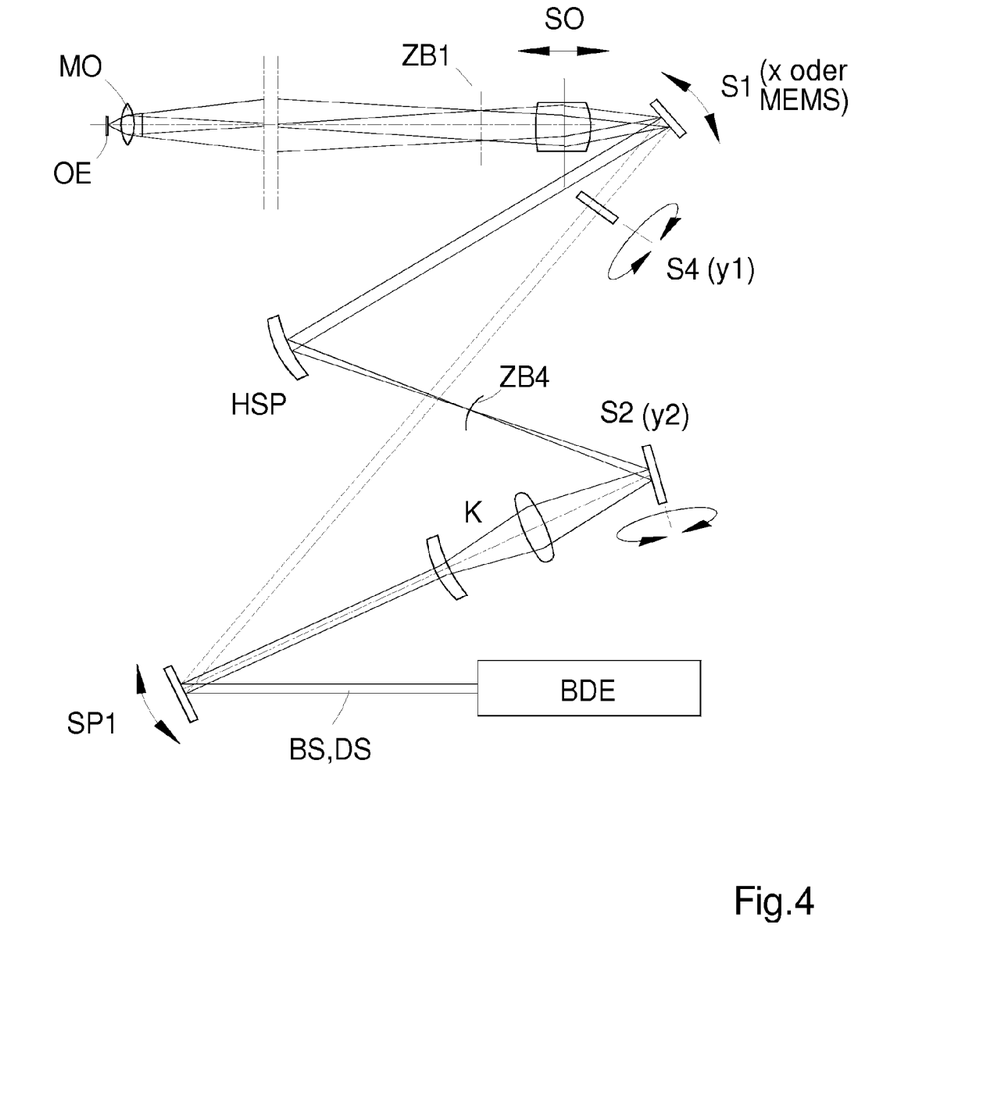
FIG. 4 shows the embodiment according to FIG. 3, but with an additional scanner.

FIG. 4 shows embodiment according to FIG. 3, but provided with an additional scanner S4, which handles Y deflection in the first switching position, so that scanners S1 and S4 can be designed as a unidimensional galvo scanner and jointly bring about X-Y deflection of the beam. In the second switching position, which involves the concave mirror HSP, scanner S4 is left out of the beam path, Y deflection then being performed by scanner S2, which can be designed especially as a fast resonant scanner.

Here, scanners S4 and S2 can deflect the beam out of the drawing plane even in their initial positions, which provides a three-dimensional arrangement, the projection of which is shown in FIG. 4.

Here again, similarly as shown in FIG. 1 and FIG. 2, multiconfocal utilization may be intended, and further refractive optical components may be provided for pupil imaging.

LIST OF REFERENCE NUMBERS

AO adaptive optical element
BS illumination beam
BDE illumination and detection unit
DS detection beam
SP1, SP2, SP3 switching mirrors
HSP concave mirror
K collimator
L/T3 relay optical component
L1, L2, L3 lens optical components
MO microscope objective
OE object plane
P, P1, P2 pupil planes
S1, S2, S3, S4 scanners
SO scanning optical component
T1 lens optical component
T2 tube-lens optical component
ZB1, ZB2, ZB3, ZB4 intermediate image planes

What is claimed is:

1. A laser scanning microscope, adapted for scanning an object with laser spots in various operating modes for the purpose of obtaining object images according to various observation criteria, comprising:
    an illumination and detection unit, an illumination and a detection beam, a microscope objective, a scanning device with a scanning optical component and a plurality of scanners, wherein a plurality of switching mirrors, each with two switching positions, are provided in the illumination and detection beams, each switching position is assigned to one of a plurality of different, optically separated beam paths, each beam path defining a separate operating mode, at least one of the beam paths being provided with a concave mirror for imaging a first one of the scanners into at least one other scanner.

2. The laser scanning microscope of claim 1, wherein the scanning objective is designed for finite imaging onto an intermediate image, a collecting refractive lens optical component is provided in a first beam path for imaging the first scanner via one of the switching mirrors onto a pupil plane disposed between the switching mirror and the illumination and detection unit, and the concave mirror is provided in a second beam path for imaging the first scanner onto the second scanner, and subsequently a relay optical component is provided for imaging the second scanner via the switching mirror onto the pupil plane.

3. The laser scanning microscope of claim 2, wherein the first scanner is disposed in a pupil plane defined by the position of the microscope objective, and the intermediate image is formed between the first scanner and the concave mirror.

4. The laser scanning microscope of claim 2, wherein switching mirrors are provided to include another scanner with a separate deflection axis into the illumination and detection beams.

5. The laser scanning microscope of claim 1, wherein the scanning objective is designed for imaging at infinity, in a first beam path, the illumination beam is directed from the illumination and detection unit via the switching mirror to the first scanner and subsequently into the scanning objective, the detection beam is directed from the scanning objective to the first scanner and then via the switching mirror into the illumination and detection unit, and in the second beam path, the illumination beam is directed from the illumination and detection unit via the switching mirror, the second scanner and the concave mirror to the first scanner, and the detection beam is directed from the first scanner via the concave mirror to a second scanner and subsequently via a collimator and the switching mirror into the illumination and detection unit.

6. The laser scanning microscope of claim 5, wherein an intermediate image plane is provided between the concave mirror and the second scanner.

7. The laser scanning microscope of claim 5, wherein another scanner is arranged in the illumination and detection beams between the first scanner and the switching mirror.

8. The laser scanning microscope of claim 1, wherein the concave mirror images the first scanner into a second scanner, or into a third scanner, and subsequently a relay optical component is provided for imaging the scanners onto a pupil plane, with switching mirrors being provided between the concave mirror and the scanners for deflecting the illumination and detection beams in two different beam paths, with the second scanner being located in one of the beam paths and the third scanner in the other of the beam paths.

9. The laser scanning microscope of claim 1, wherein the first scanner is a MEMS scanning mirror for two-dimensional X,Y deflection and the other scanners perform one-dimensional Y deflection of the illumination and detection beams.

10. The laser scanning microscope of claim 1, wherein the first scanner and the second scanner are provided for deflection in separate orthogonal spatial directions.

11. The laser scanning microscope of claim 1, wherein at least a first one of the switching mirrors is tiltable between two switching positions for the purpose of beam deflection with regard to the different beam paths, wherein a scanning mirror of the first scanner, in communication with the switching mirror, is tiltable to either of two switching positions of the scanning mirror, or wherein a scanning movement of the first scanner is made to change the deflection direction corresponding with the switching positions of the first one of the switching mirrors.

12. The laser scanning microscope of claim 1, further comprising a control circuit connected with the scanner and the switching mirror for the purpose of changing the direction of the illumination and detection beams, connected with the first scanner and the other scanners of the plurality of scanners for the purpose of defining a scanning pattern for object scanning and image acquisition, and connected with a command input device for specifying one or the other operating mode.

13. The laser scanning microscope of claim 1, wherein an optical component with an adaptive optical element is coupled into the illumination and/or detection beam (BS, DS) for the purpose of influencing the Z position of laser spots, correcting system or object-related image defects, or using special imaging modalities.

14. The laser scanning microscope of claim 1, wherein the microscope is adapted for fluorescence microscopy with the illuminating light being used as excitation radiation, and the resulting fluorescence as detection radiation.

15. The laser scanning microscope of claim 1, wherein the microscope is adapted for single-spot or multi-spot scanning of the object.

* * * * *

UNITED STATES PATENT AND TRADEMARK OFFICE
CERTIFICATE OF CORRECTION

PATENT NO. : 9,857,578 B2
APPLICATION NO. : 14/933917
DATED : January 2, 2018
INVENTOR(S) : Beate Boehme et al.

It is certified that error appears in the above-identified patent and that said Letters Patent is hereby corrected as shown below:

Delete title page and replace with the attached title page showing the corrected illustrative figures.

Delete Drawing Sheets 1-4 and replace with the attached Drawing Sheets 1-4.

Signed and Sealed this
Twenty-fifth Day of June, 2019

Andrei Iancu
*Director of the United States Patent and Trademark Office*

(12) United States Patent
Boehme et al.

(10) Patent No.: US 9,857,578 B2
(45) Date of Patent: Jan. 2, 2018

(54) LASER SCANNING MICROSCOPE

(71) Applicant: Carl Zeiss Microscopy GmbH, Jena (DE)

(72) Inventors: Beate Boehme, Grosspuerschuetz (DE); Matthias Wald, Jena (DE); Tiemo Anhut, Jena (DE); Daniel Schwedt, Weimar (DE)

(73) Assignees: Carl Zeiss Microscopy GmbH, Jena (DE); Carl Zeiss AG, Oberkochen (DE)

( * ) Notice: Subject to any disclaimer, the term of this patent is extended or adjusted under 35 U.S.C. 154(b) by 0 days.

(21) Appl. No.: 14/933,917

(22) Filed: Nov. 5, 2015

(65) Prior Publication Data
US 2016/0131881 A1    May 12, 2016

(30) Foreign Application Priority Data
Nov. 12, 2014   (DE) .......... 10 2014 017 002

(51) Int. Cl.
*G02B 26/08*   (2006.01)
*G02B 21/00*   (2006.01)
*G02B 26/10*   (2006.01)

(52) U.S. Cl.
CPC ...... *G02B 21/0048* (2013.01); *G02B 21/006* (2013.01); *G02B 21/008* (2013.01); *G02B 21/0032* (2013.01); *G02B 21/0076* (2013.01); *G02B 26/0833* (2013.01); *G02B 26/101* (2013.01)

(58) Field of Classification Search
CPC .. G02B 21/48; G02B 21/0032; G02B 21/006; G02B 21/06; G02B 21/008; G02B 21/0076; G02B 26/08; G02B 26/0833; G02B 26/101; G02B 26/10

USPC .................... 359/201.1, 201.2, 385
See application file for complete search history.

(56) References Cited

U.S. PATENT DOCUMENTS

| 5,691,839 A | 11/1997 | Kobayashi |
| 5,936,764 A | 8/1999 | Kobayashi |
| 7,715,078 B2 * | 5/2010 | Okugawa ........... G02B 21/0048 359/201.2 |

(Continued)

FOREIGN PATENT DOCUMENTS

DE    102010026571 A1    1/2012

OTHER PUBLICATIONS

German Search Report for DE 10 2014 017 002.0, dated Dec. 11, 2014 (7 pgs).

*Primary Examiner* — Euncha Cherry
(74) *Attorney, Agent, or Firm* — Patterson Thuente Pederson, P.A.

(57) ABSTRACT

A laser scanning microscope for the acquisition of object images according to varied observation criteria. The microscope includes an illumination and detection unit, an illumination and a detection beam, a microscope objective, a scanning device with a scanning optical component and several scanners, with switching mirrors, each mirror with two switching positions, provided in the illumination and detection beams. Each switching position is assigned to one of several different, optically separate beam paths and each beam path defines a separate operating mode. A concave mirror for imaging a first scanner into at least one more scanner and vice versa is arranged in at least one of the beam paths.

15 Claims, 4 Drawing Sheets

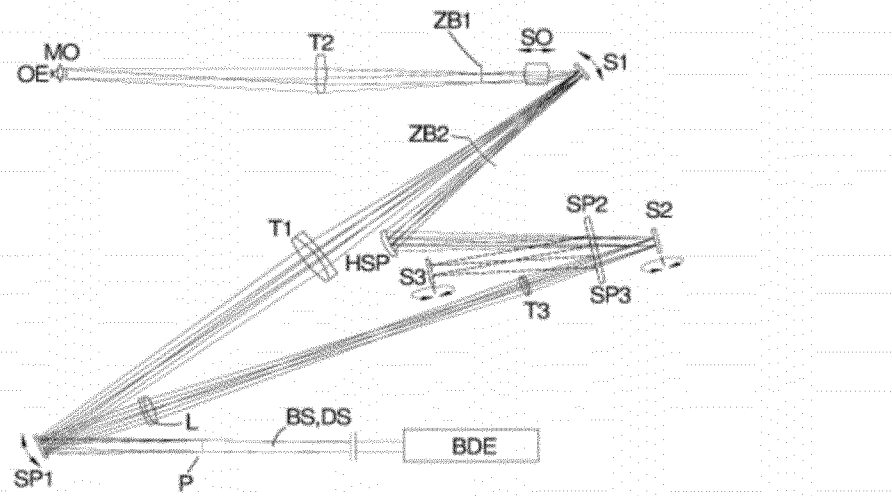

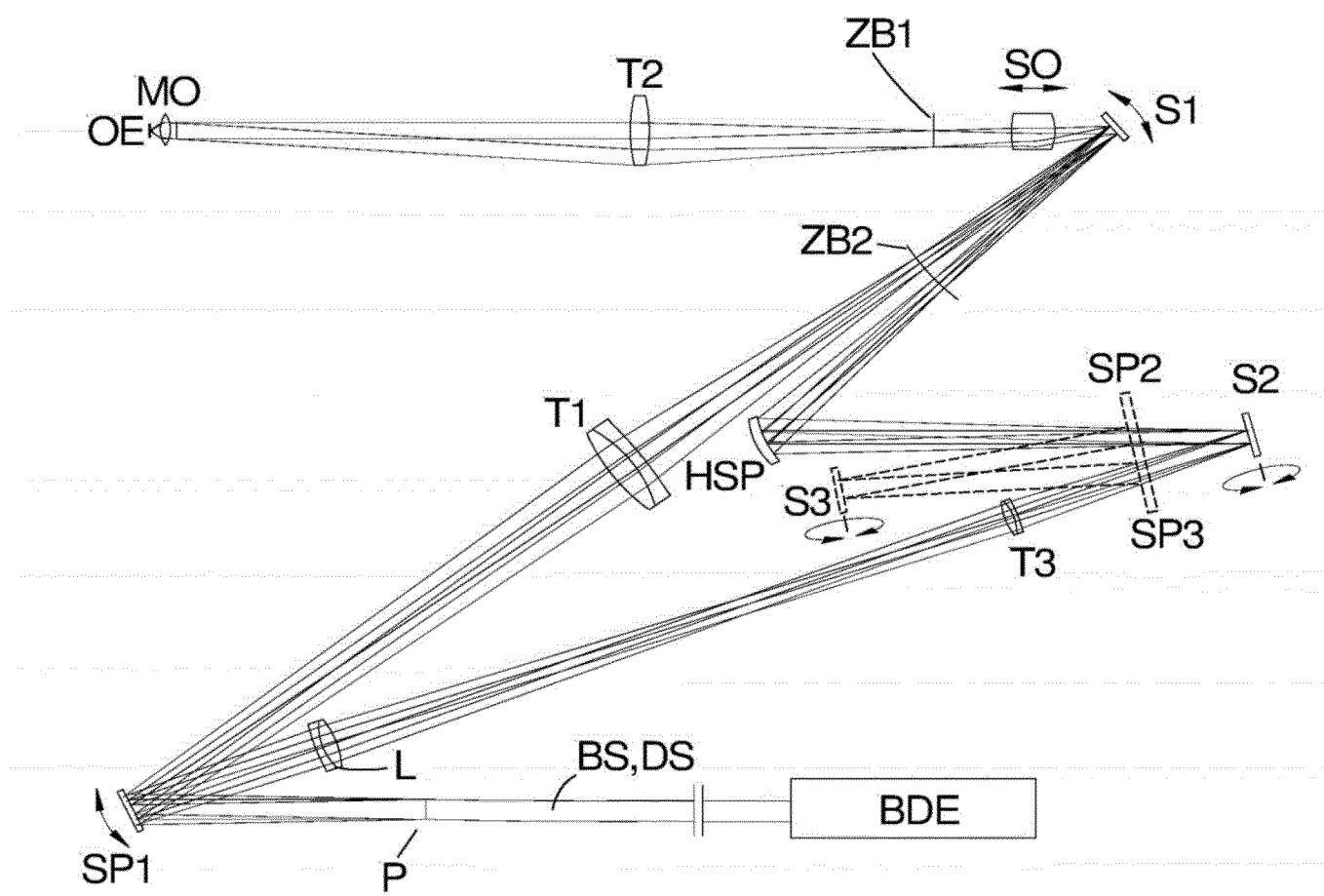
Fig.1

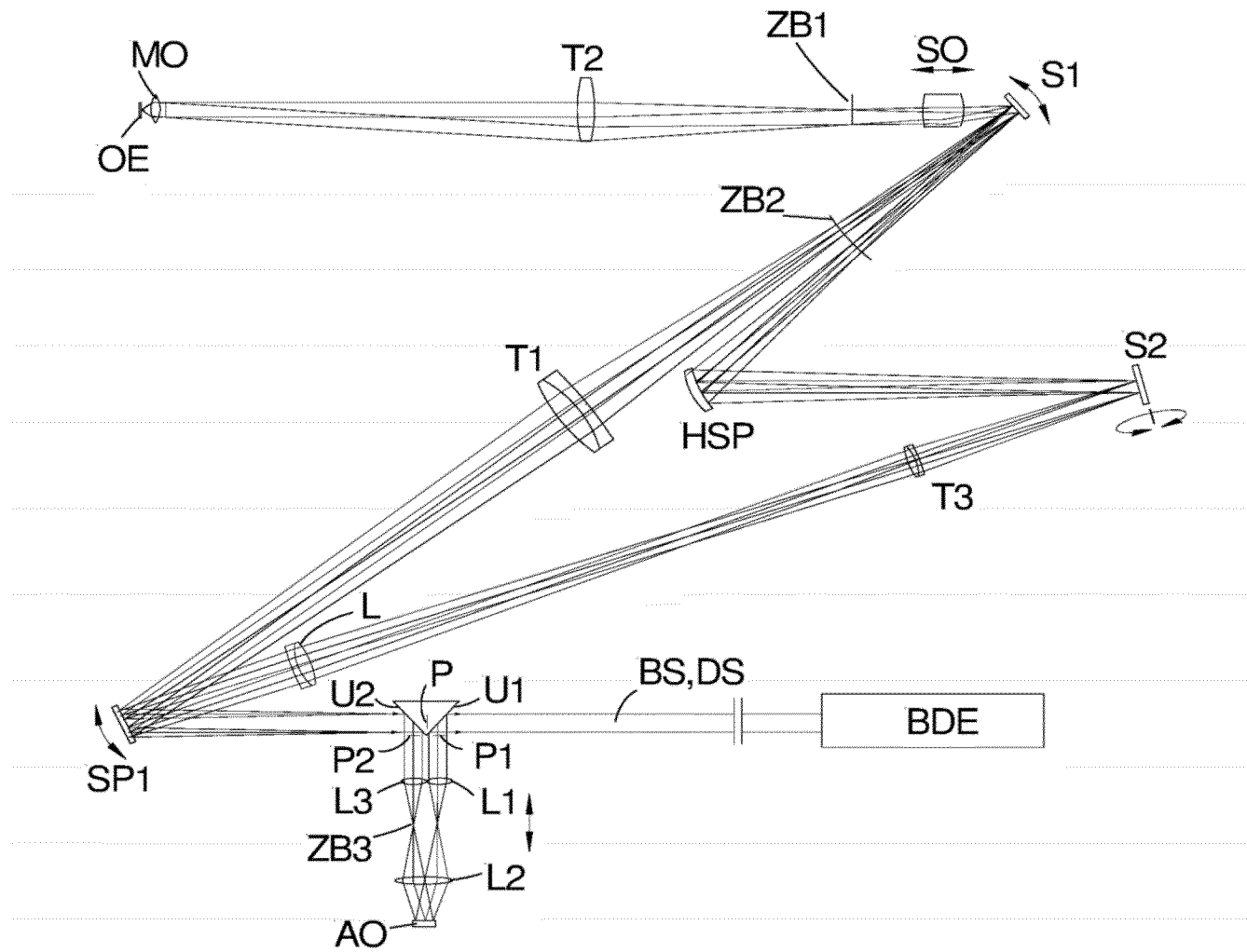
Fig.2

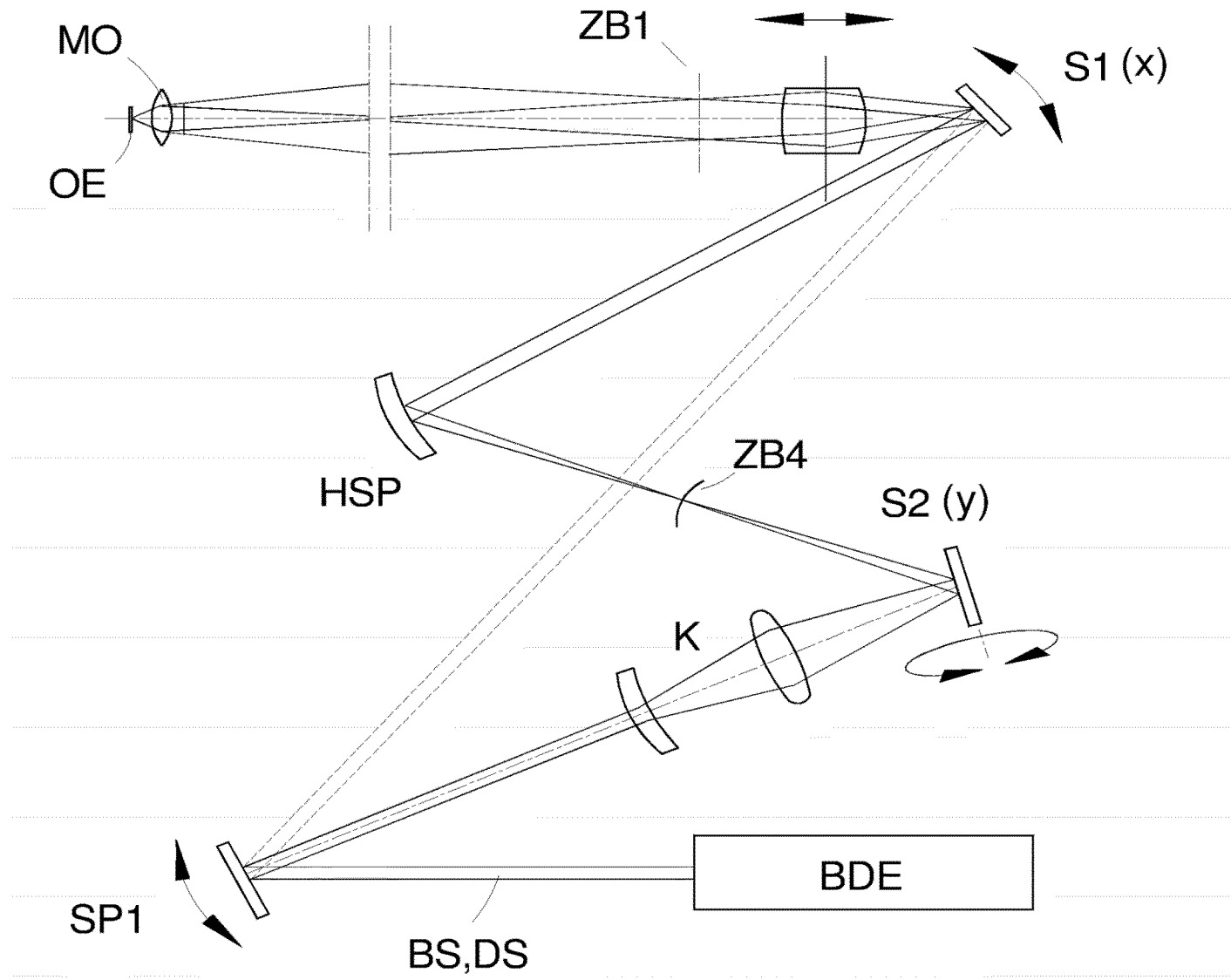
Fig.3

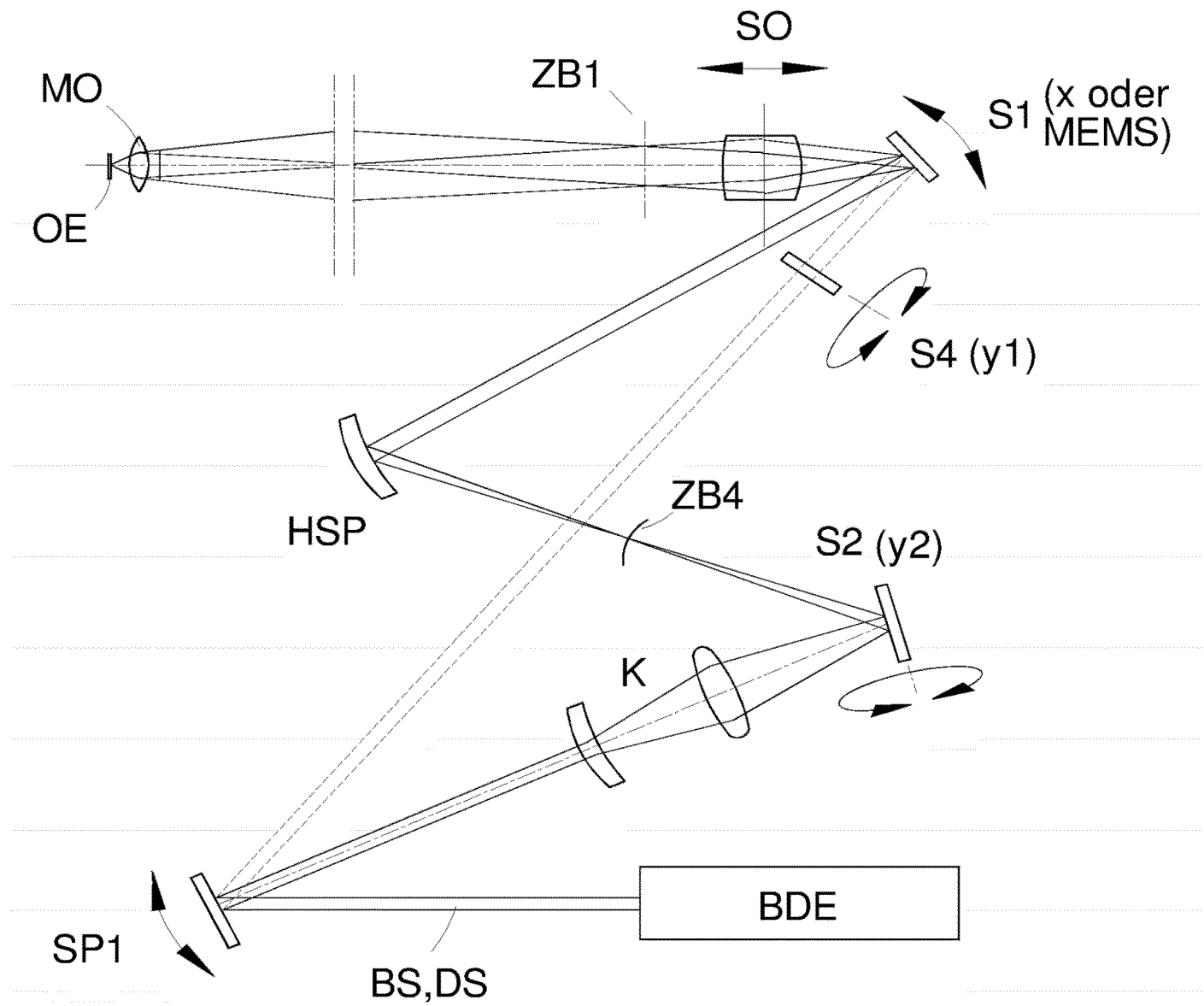
Fig.4